May 28, 1940.  C. J. ESSELING  2,202,446

PIPE GRIP

Filed Nov. 7, 1939

Inventor,
C. J. Esseling
by: Glascock Downing Seebold
Attys.

Patented May 28, 1940

2,202,446

UNITED STATES PATENT OFFICE 2,202,446

PIPE GRIP

Cornelis J. Esseling, Haarlem, Netherlands, assignor to N. V. Gebr. Stork & Co's Fabriek van Hijschwerktuigen, Haarlem, Netherlands, a company of the Netherlands Application November 7, 1939, Serial No. 303,298
In the Netherlands November 29, 1938

2 Claims. (Cl. 255—23)

This invention relates to pipe grips used in rotary drilling.

A rotary drilling machine comprises a horizontal table adapted, through a suitable clutch, to be driven by a motor and provided with a pipe grip, which transmits rotary motion of the table to a drill pipe extending therethrough while permitting upward and downward movement of said pipe.

An object of the invention is to provide a practical and desirable form of pipe grip. Other objects and the novel features of construction, combinations and relations of parts by which the same are attained, will appear as the specification proceeds.

In the accompanying drawing, a preferred embodiment of the invention is illustrated, but it is to be understood that the structure may be modified and changed as regards the present disclosure, within the true intent and broad scope of the invention.

Figure 1:
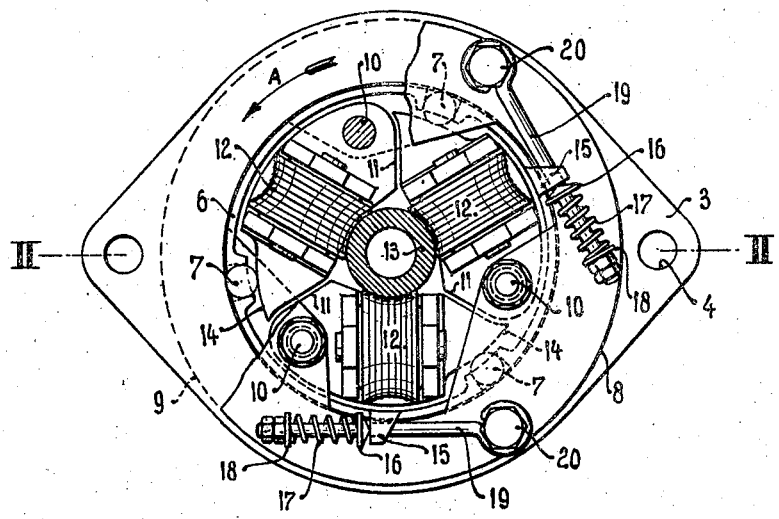
Fig. 1 is a broken plan and part sectional view of the said embodiment.
Figure 2:
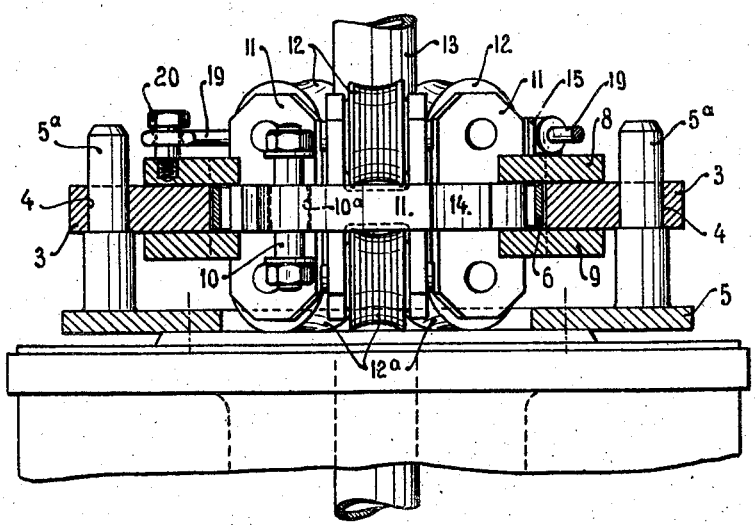
Fig. 2 is a vertical sectional view as on line II—II, of Fig. 1, some of the parts being shown in elevation.

The illustrated grip comprises a flat, horizontal support 3 having holes 4 fitting vertical pins 5ª secured to the rotary table 5. Said support is of annular formation and houses an annular cage 6 for three vertical rollers 7, which are spaced apart 120° and radially project from said cage.

Mounted on the top and the bottom side of support 3 are annular discs 8 and 9, respectively, which partly project inwardly from the inner edge of the support so as to hold cage 6 in its proper place. Said discs are interconnected by three vertical bolts 10, the central portion of each of which forms the pivot of a bracket 11 carrying two equally sized concave rollers 12, 12ª projecting above disc 8 and below disc 9, respectively. Said rollers are provided with circumferential corrugations and rotatably mounted about parallel, horizontal axes lying in a common vertical plane, it being understood that the curvature of their concave generatrices is adapted to that of the drill pipe 13, which is to follow rotary motion imparted to the table 5 through conventional means not shown.

At the end remote from its pivot bolt 10, each bracket has a cam face 14 located radially opposite a roller 7 and forming a race therefor. Said cam face 14 and the inner edge of the central hole of support 3 slightly converge in the direction of rotation of table 5 as indicated by arrow A.

The cage 6 is provided with three radial lugs 15 overhanging disc 8. Each of said lugs bears against one washer 16 of a coiled spring 17, whose second washer 18 is adjustably mounted on a horizontal screw bolt 19, which is encircled by said spring and hinged about a vertical stud bolt 20 tapped in disc 8.

The grip described so far operates as follows:

The springs 17 tend to urge the chuck, formed by the discs 8, 9 and the parts associated therewith, in a direction wherein the rollers 7 move up the inclines formed by the races 14.

Owing thereto, the grips formed by the brackets 11 and the rollers 12, 12ª rotatably mounted therein, swivel inwards about their pivots 10 through very small angular distances, since the rollers 7 are positively prevented from outward movement. Consequently, the rollers 12, 12ª are forcibly pressed against the drill pipe 13, which thus is coupled with the table 5 for rotation therewith, while retaining freedom of being fed through or withdrawn so as to cause the rollers 12, 12ª to revolve about their axes. If so desired, the gravity of the drill pipe 13 may be reduced or increased by means of weights or the like.

If, during drilling, the resistance encountered by the bit (not shown) secured to the lower end of the drill string abruptly decreases by a considerable amount, the torque accumulated in the string is released, so that pipe 13 is suddenly accelerated. If said acceleration were allowed to be transmitted to base plate 3, dangerous strains would be set up in the driving gear or in the motor. This transmission is, however, obviated by the one-way clutch 6, 7, 14; it being understood that, if drill pipe 13 tends to rotate at a speed exceeding that of the table 5 as a consequence of the torque therein, the rollers 7 will lag behind the chuck and the coupling is temporarily released. Thereafter, the holding engagement is restored by the springs 17.

Since the drill pipe 13 will not always assume a position exactly rectangular to the support 3, i. e., to the table 5, it might occur that only one of the rollers 12, 12ª of a pair were in gripping engagement with said pipe. With a view to obviating this inconvenience, each bracket 11 is mounted for swinging motion about a horizontal axis centrally between, and in parallel relation with the axes of their rollers 12, 12ª. This freedom of swinging motion in a vertical plane passing through the axis of pipe 13 is due to the fact that the central part 10ª of each bolt 10 is slightly barrel shaped and fits in a cylindrical hole of its bracket 11.

What I claim is:

1. In combination with a rotary table, a support associated with said table to follow rotary movement thereof, a chuck rotatably mounted in said support and carrying a plurality of pipe grips each comprising, in addition to a bracket mounted for swinging motion about an axial axis, of at least one roller mounted in said bracket for rotation about a tangential axis, wedging means for causing said pipe grips to swing about their axes into holding engagement with drill pipe extending through said table, and a spring element tending to bring about said wedging action.

2. In combination with a rotary table, a support associated with said table to follow rotary movement thereof, a chuck rotatably mounted in said support and carrying a plurality of pipe grips each comprising, in addition to a bracket mounted for swinging motion about an axial axis, of at least two rollers mounted in said bracket for rotation about tangential axes, said bracket being also mounted for swinging movement about an axis parallel with and located intermediate the roller axes, wedging means for causing said pipe grips to swing about their axial axes into holding engagement with drill pipe extending through said table, and a spring element tending to bring about said wedging action.

CORNELIS J. ESSELING.